United States Patent Office 3,081,262
Patented Mar. 12, 1963

3,081,262
COMPOSITIONS THICKENED BY FORMOLITE RESINS
Judson E. Goodrich, San Rafael, Calif., assignor to California Research Corporation, San Francisco, Calif., a corporation of Delaware
No Drawing. Filed Oct. 27, 1960, Ser. No. 65,260
16 Claims. (Cl. 252—38)

This invention pertains to thickened organic and aqueous compositions attained by incorporating certain resins in an organic or aqueous fluid. In particular, this invention pertains to thickened liquid compositions, including lubricating grease compositions which are particularly useful under extreme pressure, more particularly to grease compositions wherein oils of lubricating viscosity are thickened to grease consistency by the use of certain resins.

This application is a continuation in part of U.S. patent application Serial No. 783,137, filed December 29, 1958, now abandoned.

With emphasis on the lubrication oil, it is becoming more and more prevalent to form grease composition blends which can be used for more than one purpose; that is, to form grease compositions wherein the usefulness thereof has been extended beyond that of grease compositions of the prior art. As a consequence of the rapid increase in the severity of operating conditions within industry, there is becoming an even greater demand for industrial grease compositions which are effective for the lubrication of wearing surfaces at high temperatures and under extremely heavy loads, that is, under extreme pressures. Thus, the load carrying capacity demanded of metal wearing surfaces is constantly being increased with the ever advancing developments in the industrial fields, particularly those in the heavy industries.

Steel mill operations, particularly those which are used for the rolling of metals, require grease compositions having high melting points and high extreme pressure characteristics. One such operation in a steel mill involves the transformation of steel ingots into rods or sheets by passing the hot metal through the roll mill assemblies for the purpose of reducing the cross-sectional area of the hot metal. The rolls through which the hot metal must pass are supported by bearings which are known in the industry as "roll-neck bearings." As is well known, it is an extremely expensive operation to shut down a mill for the replacement of such bearings, particularly where the bearings fail, due to failure of lubrication. Therefore, it is a prime requisite in roll mill operations that the lubricants withstand the effects of heavy duty service and proper lubrication at all times to prevent lubricating failures.

A primary factor to consider in the lubrication of antifriction "roll-neck bearings" is the extreme load to which the roll necks must be subjected when hot metals are passing through the rolls. As the pressures under which the roll neck bearing operate increase, there is a proportionate increase in the temperatures of those bearings. Such high temperatures and extreme pressures often cause a breakdown of the prior art grease compositions; for example, those greases which are thickened with a metal soap of a fatty acid, e.g., calcium hydroxy stearate.

The normally used grease thickening agents, because they do not support such extreme pressure loads, require as a further additive, various E.P. agents (i.e., extreme pressure agents), which agents are normally corrosive to metal surfaces. These metal-corrosive E. P. agents include the phosphorus, sulfur, and chlorine-containing additives, such as the esters of acids of phosphorus, sulfurized olefins, sulfurized aromatic compounds, chlorinated hydrocarbons, etc. In addition to the aforenamed E.P. agents, lead soaps (e.g., lead soaps of castor oils) are used as E.P. additives.

Such E.P. additives not only are corrosive to metal wearing surfaces, but cause changes in the characteristics of grease compositions. For example, the E.P. additives cause changes in consistency, dropping points, bleeding characteristics, etc., of the greases. Also, although some E.P. additives assist grease compositions to pass required film strength tests immediately after the preparation of the grease, such additives actually cause a marked decrease in the film strength after relatively short periods of grease storage.

Thus, whereas it was heretofore necessary to use a particular grease for each particular operating part of industrial machinery, it is becoming more and more desirable to use one grease which can be used throughout a whole plant area. As set forth hereinabove, although numerous grease compositions of the prior art are useful as multi-purpose grease compositions, they are useful only to a limited degree; primarily, because the known grease compositions lack high film strength. It is of particular importance in the operation of modern industrial equipment, as well as current automobiles and airplanes, to use one grease composition which will suffice throughout all applications.

The thickened compositions described herein can be used for numerous purposes; such as grease compositions particularly useful in steel mill motors, steel mill transfer cable bearings, steel mill roller bearings, paper mill roller bearings, nuclear reactors, automotive wheel bearings, bearings of amphibious military vehicles, high temperature cannery equipment, exposed control surface bearings for aircraft, etc.

Therefore, it is an object of the invention to provide thickened fluid compositions from organic and aqueous media.

It is a primary object of this invention to provide grease compositions characterized by high melting points and high extreme pressure characteristics, which grease compositions are relatively non-corrosive to metal working surfaces.

In accordance with this invention, it has been discovered that high melting point, high extreme pressure grease compositions are obtained by the use of certain particular infusible resins as grease thickening agents. In particular, this invention pertains to grease compositions obtained by thickening oils of lubricating viscosity with infusible resins of relatively high molecular weight; that is, resins which are obtained by reacting formaldehyde with aromatic compounds in the presence of acid catalysts. It is also within the purview of this invention to incorporate such resins in grease compositions thickened by known grease thickening agents.

Not only are the thickened compositions described herein useful as high temperature water-resistant greases, they are also useful for inks, creams, latex paints, varnishes, adhesives, etc.

The infusible formolite resins used herein as thickening agents are condensation products obtained by reacting an aromatic hydrocarbon with formaldehyde in the presence of an acid catalyst.

The aromatic hydrocarbons used in the formation of the thickening agents herein are aromatic hydrocarbons containing a benzene ring. Aromatic hydrocarbons particularly preferred are alkyl substituted benzene compounds containing no more than 2 alkyl radicals substituted on the benzene ring, each alkyl radical containing no more than 6 carbon atoms.

Included as aromatic hydrocarbons are those represented by the formula

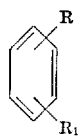

wherein R can be hydrogen or an alkyl radical containing no more than 6 carbon atoms, and $R_1$ can be hydrogen, an alkyl radical containing no more than 6 carbon atoms, a phenyl radical, or an alkylphenyl radical wherein the alkyl radical contains no more than 6 carbon atoms.

Aromatic hydrocarbon reactants are exemplified by benzene, n-butylbenzene, toluene, o-xylene, m-xylene, p-xylene, toluene, biphenyl, cumene, p-cymene, phenanthrene, aromatic petroleum fractions, etc.

Formaldehyde may be used as a reactant, as well as compounds which yield formaldehyde under the conditions of the reaction, including paraformaldehyde, methylal, alpha-trioxymethylene, and metaformaldehyde, etc.

The acid catalysts include sulfuric acid, hydrofluoric acid, etc.

The reaction of formaldehyde with aromatic hydrocarbons in the presence of acid catalysts is well described in the literature. However, the literature states that the products obtained by such reactions include diphenyl methane, and two types of resinous products. One of the resin products is a high melting essentially oxygen free resin soluble in most organic solvents (melting at about 200° F.). The other resin product is an infusible resin insoluble in all common solvents, and containing a significant amount of oxygen. The literature describes both of these latter resins as formolite resins; however, the thickening agents described in this invention are derived from the latter infusible resins insoluble in all common solvents.

Thus, as used herein, the term "resin" means the products obtained as an infusible resin insoluble in all common solvents and containing significant amounts of oxygen, which resin is obtained by reacting aromatic hydrocarbon described hereinabove with a formaldehyde producing compound in the presence of an acid catalyst.

Although not intended to be bound thereby, it has been postulated that these infusible resins have the following formula:

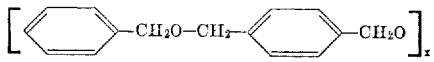

wherein $x$ is a number indicative of the molecular weight of these resins. Although this formula indicates a linear polymeric compound, these polymers are also crosslinked.

This postulated structure is supported by infra red analysis of the resin obtained. Infra red analysis show the presence of ether linkages and highly substituted aromatic radicals.

Fluids which may be thickened by the fusible resins described herein include substances which are liquid at room temperature, that is, non-metallic substances which are liquid at room temperature. Such substances include hydrocarbon fluids as exemplified by petroleum fractions, hexane, octane, dodecane, benzene, toluene, lubricating oils, fluorocarbons, etc.; alcohols, for example, ethanol, butanol, hexanol, etc.; ketones, for example, acetone, methyl, ethyl ketone; carboxylic acids, for example, acetic acid, butyric acid, decanoic acid, octadecanoic acid, etc.

Lubricating oils which are suitable herein as base oils for the compositions of this invention include a wide variety of lubricating oils, such as naphthenic base, paraffin base and mixed base, other hydrocarbon lubricants, e.g., lubricating oils derived from coal products, and synthetic oils, e.g., alkylene polymers (such as polymers of propylene, butylene, etc., and mixtures thereof), alkylene oxide-type polymers, dicarboxylic acid esters, liquid esters of acids of phosphorus, numerous alkyl benzenes, polymers of silicon, polyphenyls, (e.g., biphenyls and terphenyls), alkyl biphenyl ethers, etc.

Synthetic oils of the alkylene oxide-type polymers which may be used include those exemplified by the alkylene oxide polymers (e.g., propylene oxide polymers) and derivatives, including alkylene oxide polymers prepared by polymerizing the alkylene oxide, e.g., propylene oxide in the presence of water or alcohols, e.g., ethyl alcohol, esters of ethylene oxide-type polymers, e.g., acetylated ethylene oxide polymers prepared by acetylating ethylene oxide polymers containing hydroxyl groups; polyethers prepared from ethylene glycols, e.g., ethylene glycol, etc.

Synthetic oils of the dicarboxylic acid ester type include those which are prepared by esterifying such dicarboxylic acids as adipic acid, azelaic acid, suberic acid, sebacic acid, alkanol succinic acid, fumaric acid, maleic acid, etc., with alcohols such as butyl alcohol, hexyl alcohol, 2-ethyl hexyl alcohol, dodecyl alcohol, etc. Examples of dibasic (dicarboxylic) acid ester synthetic oils include dibutyl adipate, dihexyl adipate, di-2-ethyl hexyl sebacate, and di-N-hexyl fumaric polymer.

Synthetic oils of the alkyl benzene type include those which are prepared by alkylating benzene (e.g., dodecyl benzene, tetradecyl benzene, etc.).

Synthetic oils of the types of polymers of silicon include the liquid esters of silicon and the polysiloxanes, which include those exemplified by tetraethyl silicate, tetraisopropyl silicate, tetra(4-methyl-2-penta) silicate, poly (methyl) siloxane, poly(methylphenyl) siloxane, etc.

The above lubricating oils may be used individually as such, or in various combinations, wherever miscible or wherever made so by the use of mutual solvents.

As thickening agents, amounts of 5% to 50%, by weight, of the resin may be used. As grease thickening agents, the resins described herein are incorporated in oils of lubricating viscosity in amounts sufficient to thicken the oils to the consistency of a grease, including amounts of 5% to 50%, by weight; more preferably, 10% to 30%, by weight.

In the preparation of the infusible resins which are used as thickening agents according to this invention; it is preferred to form a blend of the acid catalyst and the aromatic hydrocarbon, then slowly add the formaldehyde (or formaldehyde-producing component) to this blend, avoiding at all times a high concentration of formaldehyde in the presence of the acid.

The mol ratio of aromatic hydrocarbon to formaldehyde may have values from 0.5 to about 4, preferably from 0.5 to about 1.

The reaction temperatures may vary, for example, from approximately 55° F. to about 173° F. It is preferred that the reaction temperatures be no more than 173° F. Since the yield of the desired product decreases with increased temperature, it is still further preferred that the temperature be in the lower range (e.g. 35° F. to 55° F.).

As a solvent for the reaction in the formation of the infusible resin, there may be used carbon tetrachloride, numerous hydrocarbon petroleum thinners, etc.

Numerous agents are effective in dispersing the described formolite resins to obtain the desired critical particle size necessary to the formation of grease compositions. Such dispersants include metal sulfonates, oil soluble non-ionic detergents, polymeric detergents, cationic-anionic detergents, quaternary alkylamines, alkyl esters of glycerine, etc.

The following examples describe the preparations of various infusible resins useful herein as grease thickening agents. Although the resin itself is a grease thickening agent, other grease thickening agents, such as the normal soaps of fatty acid (e.g., sodium stearate) may be used in combination with the resins described herein. When used in combination herein, the secondary thickening agents such as the metal soaps of fatty acids are present in minor amounts, that is, amounts insufficient to thicken the lubricating oils to the consistency of greases.

EXAMPLE I

*Preparation of an Infusible Resin From Benzene and Formaldehyde*

A mixture of 640 ml. of carbon tetrachloride, 94 ml. (1.06 mol) of benzene, 373 ml. of 98% sulfuric acid, and 8 ml. of a 25% concentrate of a dispersant[1] in carbon tetrachloride was blended in a 1500 ml. glass turbomixer. After the mixture had been thoroughly blended together, the mixture was cooled to 35° F. in an ice-salt bath, after which 117 ml. (1.65 mols) of 38% aqueous formaldehyde was added dropwise with vigorous agitating over a period of about one hour. During this reaction time, the temperature rose to about 55° F. The resulting slurry was poured into cold acetone, filtered, and washed several times with fresh acetone. The resulting product was a dark filter cake, which was placed in a beaker, agitated with fresh water, and to which was added 80% solution of ammonium hydroxide. The product turned bright yellow in color. The slurry was filtered, washed once with fresh water, twice with acetone, and twice with hexane. The final product was a light yellow powder (84.2 grams).

EXAMPLE II

*Preparation of a Grease From a Resin Obtained by Reaction of Benzene With Formaldehyde*

A mixture of 114.5 grams of a California solvent refined naphthenic base oil having a viscosity of 450 SSU at 100° F. and 5.3 grams (0.19 equivalent) of a stearic acid was heated to a temperature of 150° F. To this mixture was added 20 grams of the resin of Example I hereinabove, followed by an aqueous slurry of 2.8 grams (0.076 equivalent) of calcium hydroxide in 20 ml. water. The mixture was agitated vigorously and heated to a temperature of about 360° F., after which it was pan cooled, and passed through a Manton Gaulin homogenizer at 5,000 pounds pressure. The resulting grease was a smooth, brown grease having an ASTM worked penetration ($P_{60}$) of 285 and an ASTM dropping point in excess of 580° F.

The particular particle size of the formolite resin is critical to the success of its use as a grease thickening agent. When used as described herein, it is preferred that the average particle size of the dispersed resin be no more than 0.1 micron.

As noted hereinabove, the infusible resins can be used in combination with other grease thickening agents (e.g., soap thickened grease compositions) to improve the extreme pressure characteristics thereof. Such other grease compositions include those thickened by metal soaps of fatty acids containing from 12 to 30 carbon atoms (as exemplified by lithium stearate, sodium stearate, barium stearate, magnesium stearate, calcium oleate, barium oleate, magnesium oleate, etc.), salts of terephthalamic acids (e.g., sodium N-octadecyl terephthalamate), etc.

Table I hereinbelow describes the characteristics of a grease composition containing benzene-formaldehyde resin. This grease was obtained by dispersing 16% benzene-formaldehyde resin, 4% calcium stearate and 1% calcium hydroxide in a solvent refined California naphthenic base oil having a viscosity of 450 SSU at 100° F.

The tests used to evaluate this grease composition are described as follows:

The water resistance was determined by immersing a ball of grease of 5 grams weight in boiling distilled water. At the termination of the test (at the end of one hour) the grease ball had been unaffected by the boiling water.

The "Bearing Life" for a particular grease composition was determined by the following test procedure which is known as the Navy High Speed Bearing Test, also known as Federal Standard No. 791, Test Method 331. In the test, a ball bearing packed with a grease was operated at 10,000 r.p.m. continuously for 22 hours at the noted temperature with a 5 pound axial load, and 3 pound radial load. The apparatus was then cooled to room temperature during a period of two hours. This procedure of operation at 10,000 r.p.m. at the noted temperature and cooling was repeated until there was bearing failure. The number of hours in the table is the number of hours prior to bearing failure.

The roll test was run by placing 75 grams of grease in a roll test apparatus which is described in Military Specification MIL-G-10924A. However, whereas the MIL-G-10924A test specifies 10 r.p.m. for the apparatus, the data herein were obtained with an apparatus operating at 175 r.p.m. Any grease remaining as a grease for a period of at least four hours in this test, is considered to have an excellent work stability.

In the Timken test, a hardened steel ring was rotated against a steel test block while the grease composition being tested was fed to the point of contact of the two test members. The feed of the rotating steel ring was at a mandrel speed of about 800 r.p.m. Pressure between the ring and the test block was regulated by applying a load to the calibrated lever arm.

The Almen test is described in "Lubricants and Lubricating" by Clower, published by the McGraw-Hill Book Co. in 1939, pages 145 to 148, inclusive. The Falex tests are described in "Journal of the Institute of Petroleum," volume 32, April 1946.

TABLE I

| | |
|---|---|
| ASTM Dropping Point, ° F | 580+. |
| Boiling water test, 1 hour | Unaffected. |
| Roll test, $P_{60}$; hours: | |
| 0 | 290. |
| 4 | 332. |
| 16 | 357. |
| 64 | 347. |
| 1000 | 401. |
| Loaded wheel bearing test, 250° F.: | |
| Retention, percent | 41. |
| Leakage | None. |
| Over-all rating | Good. |
| Bearing life, 250° F., hours | (290)(200). |
| Timken E.P. test, pass pds | 50. |
| Falex machine, pds | 4300, 4300, 4000. |
| Almen wear test (bronze on steel), mgs. weight loss | 1.6; 3.4; 1.0. |
| Falex wear test (steel on steel), mgs. weight loss | 0.9: 2.2. |

As is noted hereinabove, it is preferred to add a dispersant when preparing the infusible resin to improve its grease thickening properties. The following Table II indicates the effect of various dispersants on the ASTM worked penetration (i.e., $P_{60}$) of the grease compositions. The basic grease composition to which the dispersants were added in amount of 0.2%, contained 14% by weight of benzene formolite resin, 3.9% calcium stearate, 1.5% calcium hydroxide, in a solvent refined California naphthenic base oil having a viscosity of 450 SSU at 100° F.

TABLE II

| Dispersant: | $P_{60}$ |
|---|---|
| None | 321 |
| (1) | 295 |
| (2) | 261 |
| (3) | 282 |
| (4) | 265 |

(1) A laurylmethacrylate-maleic anhydride copolymer having a molecular weight of about 100,000.
(2) A calcium mahogany petroleum sulfonate.
(3) A high molecular weight laurylmethacrylate-diethyl-amino-ethyl methacrylate copolymer.
(4) Glyceryl monolaurate.

---
[1] The dispersant was a copolymer of lauryl methacrylate and maleic anhydride and having a molecular weight of about 100,000.

Table III hereinbelow illustrates the effect of the addition of various metal soaps to the infusible resin-thickened grease compositions. The figures of the table show the amount in grams of the various components used in the preparation of the grease.

tion, varying the aromatic portion of the resin. The resins were prepared as described in Example I hereinabove, using sulfuric acid as the catalyst. Carbon tetrachloride was used as the solvent. The greases were prepared as described in Example II hereinabove.

TABLE III

|  | Grease No. | | | | | | |
|---|---|---|---|---|---|---|---|
|  | 1 | 2 | 3 | 4 | 5 | 6 | 7 |
| Grease components (grams): | | | | | | | |
| 1. Mineral oil | 114.5 | 114.5 | 114.5 | 114.5 | 114.5 | 114.5 | 114.5 |
| 2. Benzene-formaldehyde resin | 20.0 | 20.0 | 20.0 | 20.0 | 20.0 | 20.0 | 20.0 |
| 3. Lithium stearate | 5.9 | | | | | | |
| 4. Sodium stearate | | 6.2 | | | | | |
| 5. Potassium stearate | | | 6.5 | | | | |
| 6. Magnesium stearate | | | | 6.2 | | | |
| 7. Calcium stearate | | | | | 6.5 | | |
| 8. Barium stearate | | | | | | 8.3 | |
| 9. Stearic acid | | | | | | | 5.7 |
| Stability: ASTM—($P_{60}$) | 260 | 283 | 278 | 327 | 242 | 231 | 290 |

All of the above greases contained 0.040 equivalent (based on 100 grams of grease) of excess base.

Because there is present a slight amount of surface acidity on the infusible resin (which acidity results from the catalyst used), it is desirable to incorporate a slight amount of base (e.g., calcium hydroxide) in the infusible resin thickened grease composition. However, the infusible resin thickens lubricating oils to grease consistency in the absence of this base.

Grease compositions thickened only by the infusible resins and not having included therein any soap grease thickeners were prepared as follows:

EXAMPLE III

A benzene-formaldehyde resin was prepared in the same manner as set forth hereinabove in Example I. 32.1 grams of this resin was added to 116.4 grams of a California paraffinic base oil having a viscosity of 480 SSU at 100° F. To this mixture was added 1.5 grams calcium hydroxide, and the mixture was heated with agitation to 400° F. The resulting composition was pan cooled and milled in a laboratory extrusion mill at 4,000 p.s.i. The resulting grease had a dropping point of 498° F., with a penetration value (i.e., ASTM $P_{60}$) of 282.

EXAMPLE IV

A grease was prepared as in Example III hereinabove, using a turbomixer as the dispersing means, by mixing 86 grams of the mineral oil described hereinabove and 21.7 grams of benzene formolite resin of Example I. The resulting grease contained 20.2% of the benzene formolite resin. The final grease composition, after milling in a laboratory extrusion mill at 5,000 p.s.i., had a penetration value (i.e., $P_{60}$) of 380.

Table IV hereinbelow presents data obtained with grease compositions thickened by the resins of this invention, varying the aromatic portion of the resin.

TABLE IV

| Aromatics used (amounts, ml.) | Source of formaldehyde (amounts, ml.) | | Amounts $H_2SO_4$ (98+) (ml.) | Grease characteristics | |
|---|---|---|---|---|---|
|  | Formalin | Methylal |  | $P_{60}$ (ASTM) | Dropping pt. (° F.) |
| Benzene (94) | 117 |  | 373 | 295 | 580+ |
| Biphenyl (75) | 104 |  | 332 | 361 | 532 |
| Toluene (94) | 117 |  | 373 | 336 | 580+ |
| o-Xylene (94) | 117 |  | 373 | 307 | 580+ |
| m-Xylene (94) |  | 130 | 373 | 387 | 248 |
| p-Xylene (94) |  | 130 | 373 | 260 | 495 |
| n-Butylbenzene (94) |  | 130 | 373 | 343 | 230 |
| Cumene (90) |  | 130 | 373 | 502 |  |
| p-Cymene (84) |  | 115 | 332 | 452 |  |
| Phenanthrene (71 grams) |  | 115 | 332 | 477 |  |
| A (94) | 117 |  | 373 | 460 | 200 |
| B (94) | 117 |  | 373 | 358 | 580+ |
| C (94) | 117 |  | 373 | 448 | 224 |

A. A petroleum hydrocarbon fraction containing 90% aromatics and having a boiling point range of 275° F. to 336° F.
B. A petroleum hydrocarbon fraction described as a catalytic reformer bottoms having a boiling point range of 326° F. to 580+° F.
C. An aromatic petroleum hydrocarbon fraction having a boiling point range of 300° F., and derived from a catalytically cracked gas oil fraction.

Table V hereinbelow presents further data obtained with grease compositions of this invention. The resins in each case were benzene formaldehyde resins prepared as described in Example I hereinabove, and the greases were prepared by the process of Example II hereinabove.

The base oils are described as follows:

Base oil A was di(2-ethylhexyl) sebacate;
Base oil B was a poly(phenylmethyl siloxane);
Base oil C was a California paraffinic base oil having a viscosity of 480 SSU at 100° F.; and
Base oil D was a California naphthenic base oil having a viscosity of 450 SSU at 100° F.

The numbers in Table V for the composition refer to the amounts of components as weight percent.

TABLE V

| | Grease No. | | | | | |
|---|---|---|---|---|---|---|
| | 1 | 2 | 3 | 4 | 5 | 6 |
| Grease composition: | | | | | | |
| Resin | 17.5 | 15.5 | 17.0 | 12.3 | 18.5 | 19.7 |
| Calcium stearate | 4.0 | 6.0 | 6.0 | 4.5 | 4.5 | 4.5 |
| Inhibitor (dilauryl selenide) | | | 4.7 | | | |
| Base oil A | 78.5 | | | | | |
| Base oil B | | 78.5 | | | | |
| Base oil C | | | 72.3 | | | |
| Base oil D | | | | 83.2 | 77.0 | 75.8 |
| Grease characteristics: | | | | | | |
| P₆₀ (ASTM) | 237 | 311 | 288 | 387 | 250 | 309 |
| Dropping point, °F | 580+ | 580+ | 580+ | 250 | 580+ | 580+ |
| Bearing life, 300° F., hours | 78 | 72 | 206 | | | |

The data of Table VI hereinbelow further show the results obtained by combining other grease thickening agents with infusible resins in the formation of grease compositions.

TABLE VI

| | 1 | 2 | 3 | 4 |
|---|---|---|---|---|
| Composition (percent, weight): | | | | |
| Benzene-formaldehyde resin | 17.0 | 19.0 | 18.4 | 13.0 |
| Calcium stearate | | 4.0 | | |
| Barium stearate | | | 5.0 | |
| Sodium N-octadecyl terephthalamate | | | | 3.8 |
| Barium hydroxide octahydrate | | | 1.2 | |
| Calcium hydroxide | 1.0 | 1.0 | | |
| Base oil C (as described hereinabove) | 82.0 | | 73.4 | 83.2 |
| Base oil D (as described hereinabove) | | 76.0 | | |
| Grease characteristics: | | | | |
| P₆₀ | 282 | 297 | 317 | 271 |
| Dropping pt. °F | 498 | 580+ | 536 | 534 |
| Falex, pounds | 1,900 | 4,200 | 2,700 | 1,700 |

The thickening characteristics of the infusible resins described herein are further illustrated by the data of Tables VII and VIII hereinbelow. The Table VII data were obtained by incorporating approximately 13% of an infusible resin prepared as in Example I hereinabove was worked into the noted fluid with a spatula.

TABLE VII

Liquid tested:  Physical characteristic of resulting composition
(1) Hexane _____ Smooth paste.
(2) Tolune _____ Do.
(3) ¹ _____ Do.
(4) ² _____ Do.
(5) Water _____ (³).

¹ A poly(methylphenyl) siloxane.
² A fluorocarbon oil.
³ A stiff, smooth paste was obtained by passing through a 3-roll paint mill a blend consisting of 16.6% by weight of formolite resin prepared as in Example I hereinabove, 82.9% water and 0.5% of a non-ionic dispersant.

The data of Table VIII were obtained by incorporating the noted amount of an infusible resin prepared as in Example I hereinabove in the noted liquid by means of a spatula to form, in each instance, a stiff, smooth paste.

TABLE VIII

Liquid tested:  Amount of resin (weight percent)
Ethanol _____ 20
n-Butanol _____ 15
Diethyl ether _____ 18
Dioxane _____ 15
Acetic acid _____ 20
Tricresyl phosphate _____ 20

In addition to the components described hereinabove, the grease compositions of this invention may have incorporated therein oxidation inhibitors, extreme pressure agents, oiliness agents, coloring agents, corrosion inhibitors, etc.

I claim:

1. A thickened composition consisting essentially of an organic substance which is liquid at room temperature and from 5% to 50%, by weight, of a liquid thickening agent obtained by reacting from 0.5 mol to 4 mols of an aromatic hydrocarbon with a mol of a formaldehyde-producing agent in the presence of an acid catalyst at temperatures from 35° F. to 173° F.

2. A thickened composition consisting essentially of a major proportion of an organic substance which is liquid at room temperature and from 10% to 30%, by weight, of a liquid-thickening agent obtained by reacting from 0.5 mol to 4 mols of an aromatic hydrocarbon with a mol of a formaldehyde-producing agent in the presence of an acid catalyst at temperature from 35° F. to 173° F.

3. A grease composition comprising a major proportion of an oil of lubricating viscosity and from about 5%, by weight, to about 50%, by weight, of a grease thickening agent obtained by reacting 0.5 mol to 4 mols of an aromatic hydrocarbon with a mol of a formaldehyde-producing agent in the presence of an acid catalyst at temperatures from 35° F. to 173° F.

4. A grease composition comprising a major proportion of an oil of lubricating viscosity and from about 10%, by weight, to about 30%, by weight, of a grease thickening agent obtained by reacting 0.5 mol to 4 mols of an aromatic hydrocarbon with a mol of a formaldehyde-producing agent in the presence of an acid catalyst at temperatures from 35° F. to 173° F.

5. The grease composition of claim 4, wherein said aromatic hydrocarbon is benzene.

6. The grease composition of claim 4, wherein said aromatic hydrocarbon is toluene.

7. The grease composition of claim 4, wherein said aromatic hydrocarbon is a xylene.

8. The grease composition of claim 4, wherein said aromatic hydrocarbon is an alkylbenzene.

9. A grease composition comprising a major proportion of an oil of lubricating viscosity, and from about 5% to about 50%, by weight, of a benzene-formaldehyde infusible resin obtained by the reaction of benzene with formaldehyde in the presence of an acid catalyst at temperatures from 35° F. to 173° F., wherein the mol ratio of benzene to formaldehyde has a value from 0.5 to 4.

10. A grease composition comprising a major proportion of an oil of lubricating viscosity, and from about 10% to about 30%, by weight, of a benzene-formaldehyde infusible resin obtained by the reaction of benzene with formaldehyde in the presence of an acid catalyst at temperatures from 35° F. to 173° F., wherein the mol ratio of benzene to formaldehyde has a value from 0.5 to 4.

11. A grease composition comprising a major proportion of an oil of lubricating viscosity, and from about 10% to about 30%, by weight, of a benzene-formaldehyde infusible resin obtained by the reaction of benzene with formaldehyde in the presence of an acid catalyst at temperatures from 35° F. to 173° F., wherein the mol ratio of benzene to formaldehyde has a value from 0.5 to 1.

12. A grease composition comprising a major proportion of an oil of lubricating viscosity, and from about 10% to about 30%, by weight, of a benzene-formaldehyde infusible resin obtained by the reaction of benzene with formaldehyde in the presence of an acid catalyst at temperatures from 35° F. to about 55° F., wherein the mol ratio of benzene to formaldehyde has a value from 0.5 to 4.

13. A grease composition comprising a major proportion of an oil of lubricating viscosity, a minor proportion of a metal-containing grease thickening agent, in combination therewith, from 10%, by weight, to about 30%, by weight, of an aromatic hydrocarbon-formaldehyde infusible resin grease thickening agent obtained by the reaction of an aromatic hydrocarbon and formaldehyde in the presence of an acid catalyst at temperatures from 35° F. to 173° F., wherein the mol ratio of aromatic hydrocarbon to formaldehyde has a value from about 0.5 to 4.

14. The grease composition of claim 13, wherein the aromatic hydrocarbon is toluene.

15. The grease composition of claim 13, wherein the aromatic hydrocarbon is a xylene.

16. The grease composition of claim 13, wherein the aromatic hydrocarbon is of the formula:

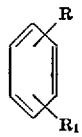

wherein R is selected from the group consisting of hydrogen and alkyl radicals containing no more than 6 carbon atoms, and $R_1$ is selected from the group consisting of hydrogen, an alkyl radical containing no more than 6 carbon atoms, a phenyl radical, and an alkylphenyl radical.

References Cited in the file of this patent
UNITED STATES PATENTS

| | | |
|---|---|---|
| 2,412,589 | Lieber | Dec. 17, 1946 |
| 2,612,474 | Morgan et al. | Sept. 30, 1952 |
| 2,704,363 | Armstrong | Mar. 15, 1955 |

UNITED STATES PATENT OFFICE
CERTIFICATE OF CORRECTION

Patent No. 3,081,262                                 March 12, 1963

Judson E. Goodrich

It is hereby certified that error appears in the above numbered patent requiring correction and that the said Letters Patent should read as corrected below.

Column 3, line 59, for "fusible" read -- infusible --; column 5, line 34, for "(0.19 equivalent)" read -- (0.019 equivalent) --; column 8, TABLE IV, the third column heading, for "Amounts $H_2SO_4$ (98+) (ml.)" read -- Amounts $H_2SO_4$ (98%) (ml.) --.

Signed and sealed this 8th day of October 1963.

(SEAL)
Attest:

ERNEST W. SWIDER                                 EDWIN L. REYNOLDS
Attesting Officer                          Acting Commissioner of Patents